(12) United States Patent
Zischka et al.

(10) Patent No.: US 10,654,253 B2
(45) Date of Patent: May 19, 2020

(54) MULTI-LAYER CARDBOARD MATERIAL AND METHOD FOR PRODUCING A MULTI-LAYER CARDBOARD MATERIAL

(71) Applicant: MAYR-MELNHOF KARTON AG, Vienna (AT)

(72) Inventors: Michael Zischka, Stattegg-Muhl (AT); Mathias Magin, Speyer (DE)

(73) Assignee: MAYR-MELNHOF KARTON AG, Vienna (AT)

( * ) Notice: Subject to any disclaimer, the term of this patent is extended or adjusted under 35 U.S.C. 154(b) by 42 days.

(21) Appl. No.: 15/746,294

(22) PCT Filed: Jul. 15, 2016

(86) PCT No.: PCT/EP2016/066902
§ 371 (c)(1),
(2) Date: Jan. 19, 2018

(87) PCT Pub. No.: WO2017/013015
PCT Pub. Date: Jan. 26, 2017

(65) Prior Publication Data
US 2018/0207921 A1    Jul. 26, 2018

(30) Foreign Application Priority Data

Jul. 20, 2015    (EP) .................... 15177486

(51) Int. Cl.
*B32B 29/08* (2006.01)
*B32B 29/00* (2006.01)
(Continued)

(52) U.S. Cl.
CPC ............. *B32B 29/08* (2013.01); *B32B 29/00* (2013.01); *B32B 29/002* (2013.01);
(Continued)

(58) Field of Classification Search
None
See application file for complete search history.

(56) References Cited

U.S. PATENT DOCUMENTS 8,029,645 B2 * 10/2011 Mohammadi .......... D21H 11/12
162/111
8,623,176 B2 * 1/2014 Vinson ................... D21H 11/12
162/148
(Continued)

FOREIGN PATENT DOCUMENTS

CN        102505797 A    6/2012
EP        2 821 547 A1   1/2015
(Continued)

OTHER PUBLICATIONS

"Mesh and Micron Sizes", Industrial Specialties Mfg., 2017, [online], retrieved from the Internet, [retrieved Jun. 28, 2019], <URL: https://www.industrialspec.com/resources/mesh-and-micron-sizes>. (Year: 2017).*

(Continued)

*Primary Examiner* — Dennis R Cordray
(74) *Attorney, Agent, or Firm* — Medler Ferro Woodhouse & Mills PLLC

(57) ABSTRACT

The invention relates to a multi-layer cardboard material (10), comprising at least one first fibrous-material layer (12), which has a cellulose-containing base material, and at least one second fibrous-material layer (14) comprising a mixture of cellulose-containing material and fine material particles, wherein a material of origin for the fine material particles is coco peat and the fine material particles have a particle size <0.5 mm, in particular <0.3 mm. The invention further relates to a method for producing a multi-layer cardboard material (10), in particular a multi-layer cardboard web, comprising at least one first and one second fibrous-material (Continued)

Figure 1:
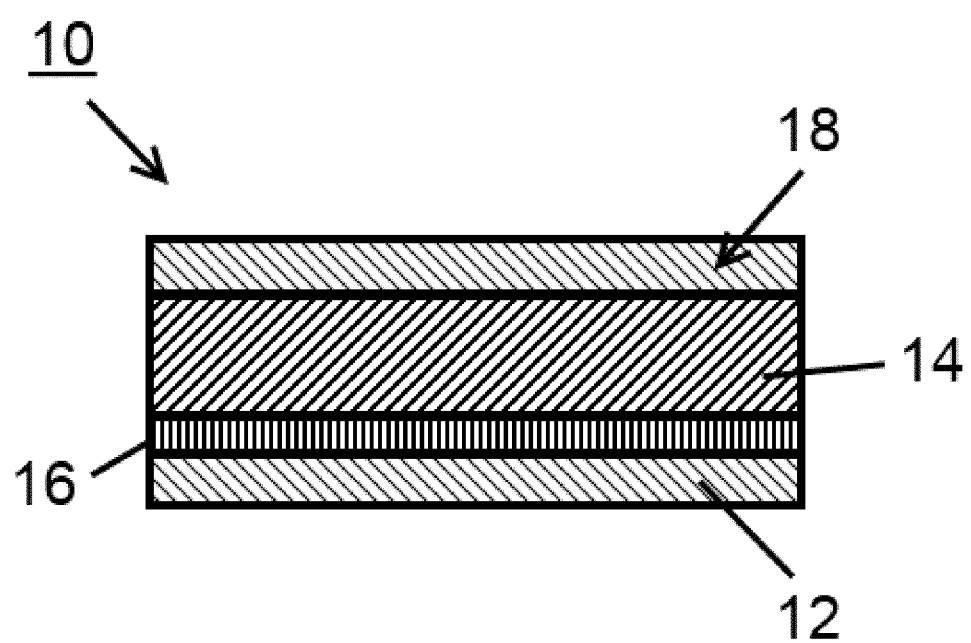

layer (12, 14), and the use of a fibrous-material layer comprising a mixture of cellulose-containing material and fine material particles.

14 Claims, 2 Drawing Sheets

(51) Int. Cl.
*D21C 5/02* (2006.01)
*D21F 11/04* (2006.01)
*D21H 11/12* (2006.01)
*D21H 19/52* (2006.01)
*D21H 27/38* (2006.01)
*D21H 19/00* (2006.01)
*D21H 27/30* (2006.01)

(52) U.S. Cl.
CPC .............. *B32B 29/005* (2013.01); *D21C 5/02* (2013.01); *D21F 11/04* (2013.01); *D21H 11/12* (2013.01); *D21H 19/00* (2013.01); *D21H 19/52* (2013.01); *D21H 27/30* (2013.01); *D21H 27/38* (2013.01); *B32B 2250/02* (2013.01); *B32B 2250/03* (2013.01); *B32B 2250/04* (2013.01); *B32B 2250/05* (2013.01); *B32B 2250/26* (2013.01); *B32B 2262/02* (2013.01); *B32B 2262/06* (2013.01); *B32B 2262/10* (2013.01); *B32B 2262/14* (2013.01); *B32B 2264/06* (2013.01); *B32B 2264/10* (2013.01); *B32B 2264/102* (2013.01); *B32B 2264/104* (2013.01); *B32B 2307/4026* (2013.01); *B32B 2307/718* (2013.01); *B32B 2553/00* (2013.01); *Y02W 30/648* (2015.05)

(56) References Cited

U.S. PATENT DOCUMENTS

| 9,011,641 | B2* | 4/2015 | Mohammadi | D21H 27/02 162/111 |
| 2009/0165973 | A1* | 7/2009 | Aula | D21F 9/006 162/133 |
| 2014/0054816 | A1 | 2/2014 | Parnas et al. | |
| 2014/0231036 | A1 | 8/2014 | Buschmann et al. | |
| 2017/0233140 | A1* | 8/2017 | McMunn | B65D 25/34 220/228 |

FOREIGN PATENT DOCUMENTS

| IN | 0788/CHE/2011 | 11/2012 |
| WO | 99/66119 A1 | 12/1999 |
| WO | 2005/042840 A2 | 5/2005 |
| WO | 2012/031345 A1 | 3/2012 |
| WO | 2016/173641 A1 | 11/2016 |
| WO | 2016/190800 A1 | 12/2016 |
| WO | 2016/190801 A1 | 12/2016 |

OTHER PUBLICATIONS

Smook, Gary A., Handbook of Pulp and Paper Terminology, Angus Wilde Publications, 1990, p. 151. (Year: 1990).*
International Search Report dated Oct. 31, 2016 in corresponding International Patent Application No. PCT/EP2016/066902.
International Preliminary Report on Patentability dated Jan. 23, 2018 in corresponding International Patent Application No. PCT/EP2016/066902.
Chilean Appl. No. 201800097; Search Report dated Nov. 19, 2018.
Office Action issued in Canadian Application No. 2,992,383, dated Feb. 26, 2019.
Chinese Office Action dated Nov. 5, 2019 in corresponding Chinese Patent Application No. 201680042181.1.

* cited by examiner

MULTI-LAYER CARDBOARD MATERIAL AND METHOD FOR PRODUCING A MULTI-LAYER CARDBOARD MATERIAL

The invention relates to a multi-layer cardboard material including at least one first and one second fibrous-material layer. Furthermore, the invention relates to a method for producing a multi-layer cardboard material as well as to the use of a fibrous-material layer.

Methods and devices for producing a multi-layer fibrous-material web, in particular paper or cardboard webs, are known from the prior art in various configurations. Therein, multiple layers of partially different fibrous materials are separately formed and then gradually pressed and couched, respectively, in particular in the cardboard production.

However, it is disadvantageous in the known cardboard materials that they usually incorporate a very high portion of so-called fresh fibers such that a very high wood demand arises herein. In order to produce multi-layer cardboard material in resource saving manner, the printed matter IN00788CH2011 A for example proposes to replace a majority of the fibrous materials in the fibrous-material layers of a multi-layer cardboard material with coco fibers. Furthermore, it is proposed to admix filling material to the individual fiber layers, wherein the filling material can be constituted of shell powder or the outer bast of the coconut. By using coconuts as a replacement material to wood fibers, such a cardboard material can basically be produced in resource saving manner since coconuts are a raw material fast regrowing and present in sufficient amounts. However, the provision of coco fibers as well as the conditioning thereof is relatively expensive such that a considerable cost increase occurs in particular in the production of high-quality cardboard material.

It is the object of the present invention to provide a multi-layer cardboard material as well as a method for producing a multi-layer cardboard material, which is producible and executable, respectively, in inexpensive and resource saving manner.

According to the invention, the object is solved by a multi-layer cardboard material having the features of claim 1 as well as by a method having the features of claim 10 as well as a corresponding use of a fibrous-material layer having a mixture of cellulose-containing material and fine material particles, wherein a material of origin for the fine material particles is coco peat and the fine material particles have a particle size <0.5 mm, in particular <0.3 mm, for producing a multi-layer cardboard material, in particular a multi-layer cardboard web. Advantageous configurations with convenient developments of the invention are specified in the respective dependent claims, wherein advantageous configurations of the cardboard material are to be regarded as advantageous configurations of the method or the use according to the invention and vice versa.

A first aspect of the invention relates to a multi-layer cardboard material including at least one first fibrous-material layer, which comprises a cellulose-containing base material, and at least one second fibrous-material layer including a mixture of cellulose-containing material and fine material particles, wherein a material of origin for the fine material particles is coco peat and the fine material particles have a particle size <0.5 mm, in particular <0.3 mm. Coco peat is a waste product from the coco fiber production. Usually, the coco fiber portion in the coco peat is less than 50%. Surprisingly, it has turned out that by the use of this waste product, namely coco peat, multi-layer cardboard materials can be produced, which are producible in inexpensive manner on the one hand and in resource saving manner on the other hand. In particular, the fine material particles having a particle size of <0.5 mm, in particular <0.3 mm, have volume increasing characteristics, which are caused by the absorption of moisture. During the production of the corresponding fibrous-material layer, the fibrous-material layer containing coco peat or the fine material particles thereof expands, wherein this volume increase remains also after drying the multi-layer cardboard material. This volume increase additionally increases the strength and the stiffness, respectively, of the multi-layer cardboard material. Advantageously, the strength and stiffness of the multi-layer cardboard material can be overall adjusted via the portion of fine material particles. Therein, the portion of fine material particles in the second fibrous-material layer can be 0.1 to 50% by wt. related to the overall weight of the second fibrous-material layer. Even a portion of 0.1% by wt. of fine material particles results in a considerable reduction of required wood material for the cardboard production with the annual demand of multi-layer cardboard material. In addition, there is the possibility that the second fibrous-material layer comprises up to 20% by wt. of fine material particles with particle sizes between 0.5 mm and 1.19 mm. The advantages according to the invention are also hereby achieved. By a portion of 0.1 to 50% by wt. of fine material particles related to the overall weight of the second fibrous-material layer, the following portions are understood within the scope of the invention: 0.1% by wt., 0.5% by wt., 1.0% by wt., 1.5% by wt., 2.0% by wt., 2.5% by wt., 3.0% by wt., 3.5% by wt., 4.0% by wt., 4.5% by wt., 5.0% by wt., 5.5% by wt., 6.0% by wt., 6.5% by wt., 7.0% by wt., 7.5% by wt., 8.0% by wt., 8.5% by wt., 9.0% by wt., 9.5% by wt., 10.0% by wt., 10.5% by wt., 11.0% by wt., 11.5% by wt., 12.0% by wt., 12.5% by wt., 13.0% by wt., 13.5% by wt., 14.0% by wt., 14.5% by wt., 15.0% by wt., 15.5% by wt., 16.0% by wt., 16.5% by wt., 17.0% by wt., 17.5% by wt., 18.0% by wt., 18.5% by wt., 19.0% by wt., 19.5% by wt., 20.0% by wt., 20.5% by wt., 21.0% by wt., 21.5% by wt., 22.0% by wt., 22.5% by wt., 23.0% by wt., 23.5% by wt., 24.0% by wt., 24.5% by wt., 25.0% by wt., 25.5% by wt., 26.0% by wt., 26.5% by wt., 27.0% by wt., 27.5% by wt., 28.0% by wt., 28.5% by wt., 29.0% by wt., 29.5% by wt., 30.0% by wt., 30.5% by wt., 31.0% by wt., 31.5% by wt., 32.0% by wt., 32.5% by wt., 33.0% by wt., 33.5% by wt., 34.0% by wt., 34.5% by wt., 35.0% by wt., 35.5% by wt., 36.0% by wt., 36.5% by wt., 37.0% by wt., 37.5% by wt., 38.0% by wt., 38.5% by wt., 39.0% by wt., 39.5% by wt., 40.0% by wt., 40.5% by wt., 41.0% by wt., 41.5% by wt., 42.0% by wt., 42.5% by wt., 43.0% by wt., 43.5% by wt., 44.0% by wt., 44.5% by wt., 45.0% by wt., 45.5% by wt., 46.0% by wt., 46.5% by wt., 47.0% by wt., 47.5% by wt., 48.0% by wt., 48.5% by wt., 49.0% by wt., 49.5% by wt., 50.0% by wt. Intermediate values are also conceivable.

By a cellulose-containing base material or a cellulose-containing material, waste paper or the like is also understood besides pulp within the scope of the present invention. In addition, by base material, it is understood that at least predominantly, that is at least 51% by wt., in particular at least 75% by wt. of the base material is constituted of cellulose. In addition, the base material can basically be uncoated or already provided with one or more layers. For example, the base material can be coated or uncoated paper, coated or uncoated cardboard or coated or uncoated paperboard. Furthermore, there is the possibility that fibrous materials of artificial, in particular plastic fibers and/or mineral fibers and/or natural fibrous material are added to the first and/or the second fibrous-material layer.

In a further advantageous configuration of the multi-layer cardboard material according to the invention, the length-to-width ratio of more than 50% of the fine material particles is 0.7:1 to 1:0.7, in particular approximately 1:1. Surprisingly, it has turned out that the volume increase and the increase of the stiffness of the multi-layer cardboard material determined thereby are greatest and most stable at the mentioned length-to-width ratios. Other length-to-width ratios are also conceivable.

In further advantageous configurations of the multi-layer cardboard material according to the invention, the first fibrous-material layer is formed as a cover or back layer of the cardboard material. Furthermore, the second fibrous material layer can be formed as an inlay of the cardboard material. In addition, an intermediate layer, namely a so-called underliner, can be formed between the cover layer and the second fibrous-material layer formed as an inlay, which in turn is predominantly constituted of cellulose-containing material. Overall, the cardboard material can be constituted of two to ten fibrous-material layers. Usually, the multi-layer cardboard material is formed as a cardboard web and is in particular qualified for the production of packagings after corresponding finishing.

In further advantageous configurations of the multi-layer cardboard material according to the invention, the second fibrous-material layer has a grammage between 70 g/m$^2$ and 450 g/m$^2$, in particular 150 g/m$^2$ and 350 g/m$^2$. By a grammage in the range between 70 g/m$^2$ and 450 g/m$^2$, the following grammages are understood within the scope of the invention: 70 g/m$^2$, 80 g/m$^2$, 90 g/m$^2$, 100 g/m$^2$, 110 g/m$^2$, 120 g/m$^2$, 130 g/m$^2$, 140 g/m$^2$, 150 g/m$^2$, 160 g/m$^2$, 170 g/m$^2$, 180 g/m$^2$, 190 g/m$^2$, 200 g/m$^2$, 210 g/m$^2$, 220 g/m$^2$, 230 g/m$^2$, 240 g/m$^2$, 250 g/m$^2$, 260 g/m$^2$, 270 g/m$^2$, 280 g/m$^2$, 290 g/m$^2$, 300 g/m$^2$, 310 g/m$^2$, 320 g/m$^2$, 330 g/m$^2$, 340 g/m$^2$, 350 g/m$^2$, 360 g/m$^2$, 370 g/m$^2$, 380 g/m$^2$, 390 g/m$^2$, 400 g/m$^2$, 410 g/m$^2$, 420 g/m$^2$, 430 g/m$^2$, 440 g/m$^2$, 450 g/m$^2$. Intermediate values are also conceivable. According to field of application and structure of the multi-layer cardboard material, the required grammages can be advantageously represented. In particular, the required stiffness values of the cardboard material can also be adjusted by such configurations of the second fibrous-material layer. The multi-layer cardboard material comprising the second fibrous-material layer can overall have a grammage between 145 g/m$^2$ and 2000 g/m$^2$, in particular 230 g/m$^2$ and 800 g/m$^2$. The grammages of the cardboard material are advantageously adapted to the field of application of the cardboard material. By a grammage of the multi-layer cardboard material in the range between 145 g/m$^2$ and 2000 g/m$^2$, the following grammages are understood within the scope of the invention: 145 g/m$^2$, 150 g/m$^2$, 160 g/m$^2$, 170 g/m$^2$, 180 g/m$^2$, 190 g/m$^2$, 200 g/m$^2$, 210 g/m$^2$, 220 g/m$^2$, 230 g/m$^2$, 240 g/m$^2$, 250 g/m$^2$, 260 g/m$^2$, 270 g/m$^2$, 280 g/m$^2$, 290 g/m$^2$, 300 g/m$^2$, 310 g/m$^2$, 320 g/m$^2$, 330 g/m$^2$, 340 g/m$^2$, 350 g/m$^2$, 360 g/m$^2$, 370 g/m$^2$, 380 g/m$^2$, 390 g/m$^2$, 400 g/m$^2$, 410 g/m$^2$, 420 g/m$^2$, 430 g/m$^2$, 440 g/m$^2$, 450 g/m$^2$, 460 g/m$^2$, 470 g/m$^2$, 480 g/m$^2$, 490 g/m$^2$, 500 g/m$^2$, 510 g/m$^2$, 520 g/m$^2$, 530 g/m$^2$, 540 g/m$^2$, 550 g/m$^2$, 560 g/m$^2$, 570 g/m$^2$, 580 g/m$^2$, 590 g/m$^2$, 600 g/m$^2$, 610 g/m$^2$, 620 g/m$^2$, 630 g/m$^2$, 640 g/m$^2$, 650 g/m$^2$, 660 g/m$^2$, 670 g/m$^2$, 680 g/m$^2$, 690 g/m$^2$, 700 g/m$^2$, 710 g/m$^2$, 720 g/m$^2$, 730 g/m$^2$, 740 g/m$^2$, 750 g/m$^2$, 760 g/m$^2$, 770 g/m$^2$, 780 g/m$^2$, 790 g/m$^2$, 800 g/m$^2$, 810 g/m$^2$, 820 g/m$^2$, 830 g/m$^2$, 840 g/m$^2$, 850 g/m$^2$, 860 g/m$^2$, 870 g/m$^2$, 880 g/m$^2$, 890 g/m$^2$, 900 g/m$^2$, 910 g/m$^2$, 920 g/m$^2$, 930 g/m$^2$, 940 g/m$^2$, 950 g/m$^2$, 960 g/m$^2$, 970 g/m$^2$, 980 g/m$^2$, 990 g/m$^2$, 1000 g/m$^2$, 1010 g/m$^2$, 1020 g/m$^2$, 1030 g/m$^2$, 1040 g/m$^2$, 1050 g/m$^2$, 1060 g/m$^2$, 1070 g/m$^2$, 1080 g/m$^2$, 1090 g/m$^2$, 1100 g/m$^2$, 1110 g/m$^2$, 1120 g/m$^2$, 1130 g/m$^2$, 1140 g/m$^2$, 1150 g/m$^2$, 1160 g/m$^2$, 1170 g/m$^2$, 1180 g/m$^2$, 1190 g/m$^2$, 1200 g/m$^2$, 1210 g/m$^2$, 1220 g/m$^2$, 1230 g/m$^2$, 1240 g/m$^2$, 1250 g/m$^2$, 1260 g/m$^2$, 1270 g/m$^2$, 1280 g/m$^2$, 1290 g/m$^2$, 1300 g/m$^2$, 1310 g/m$^2$, 1320 g/m$^2$, 1330 g/m$^2$, 1340 g/m$^2$, 1350 g/m$^2$, 1360 g/m$^2$, 1370 g/m$^2$, 1380 g/m$^2$, 1390 g/m$^2$, 1400 g/m$^2$, 1410 g/m$^2$, 1420 g/m$^2$, 1430 g/m$^2$, 1440 g/m$^2$, 1450 g/m$^2$, 1460 g/m$^2$, 1470 g/m$^2$, 1480 g/m$^2$, 1490 g/m$^2$, 1500 g/m$^2$, 1510 g/m$^2$, 1520 g/m$^2$, 1530 g/m$^2$, 1540 g/m$^2$, 1550 g/m$^2$, 1560 g/m$^2$, 1570 g/m$^2$, 1580 g/m$^2$, 1590 g/m$^2$, 1600 g/m$^2$, 1610 g/m$^2$, 1620 g/m$^2$, 1630 g/m$^2$, 1640 g/m$^2$, 1650 g/m$^2$, 1660 g/m$^2$, 1670 g/m$^2$, 1680 g/m$^2$, 1690 g/m$^2$, 1700 g/m$^2$, 1710 g/m$^2$, 1720 g/m$^2$, 1730 g/m$^2$, 1740 g/m$^2$, 1750 g/m$^2$, 1760 g/m$^2$, 1770 g/m$^2$, 1780 g/m$^2$, 1790 g/m$^2$, 1800 g/m$^2$, 1810 g/m$^2$, 1820 g/m$^2$, 1830 g/m$^2$, 1840 g/m$^2$, 1850 g/m$^2$, 1860 g/m$^2$, 1870 g/m$^2$, 1880 g/m$^2$, 1890 g/m$^2$, 1900 g/m$^2$, 1910 g/m$^2$, 1920 g/m$^2$, 1930 g/m$^2$, 1940 g/m$^2$, 1950 g/m$^2$, 1960 g/m$^2$, 1970 g/m$^2$, 1980 g/m$^2$, 1990 g/m$^2$, 2000 g/m$^2$. Intermediate values are also conceivable.

In a further advantageous configuration of the multi-layer cardboard material according to the invention, the particle size distribution of the fine material particles in the second fibrous-material layer includes at least 0.1 to 60% of particles of the size 0.15 to 0.297 mm, 0.1 to 60% of particles of the size 0.149 to 0.075 mm and 0.1 to 60% of particles of the size <0.075 mm. Larger particle sizes are also readily conceivable, wherein particles sizes larger than 0.297 mm can also be present. However, it is therein to be noted that the particle size is selected such that undesired bulges of the second fibrous-material layer do not occur. In the particle size distribution range mentioned above, particularly stable volume increases arise during the production of the multi-layer cardboard material. By a particle size portion between 0.1 and 60%, the following particle size portions are understood within the scope of the invention: 0.1%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, 41.0%, 41.5%, 42.0%, 42.5%, 43.0%, 43.5%, 44.0%, 44.5%, 45.0%, 45.5%, 46.0%, 46.5%, 47.0%, 47.5%, 48.0%, 48.5%, 49.0%, 49.5%, 50.0%, 50.5%, 51.0%, 51.5%, 52.0%, 52.5%, 53.0%, 53.5%, 54.0%, 54.5%, 55.0%, 55.5%, 56.0%, 56.5%, 57.0%, 57.5%, 58.0%, 58.5%, 59.0%, 59.5%, 60.0%. Intermediate values are also conceivable.

A second aspect of the present invention relates to a method for producing a multi-layer cardboard material, in particular a multi-layer cardboard web, including at least one first and one second fibrous-material layer, characterized in that the method includes at least the following steps: applying a first fibrous-material suspension to a first permeable or non-permeable conveyor belt for forming a first fibrous-material layer, wherein the first fibrous-material suspension comprises a cellulose-containing base material; applying a second fibrous-material suspension to a second permeable or non-permeable conveyor belt for forming the second fibrous-material layer, wherein the second fibrous-material suspension includes a mixture of cellulose-containing material and fine material particles, wherein a material of origin for the fine material particles is coco peat and the fine material particles have a particle size <0.5 mm, in particular <0.3 mm; and couching the first with the second fibrous-material layer with formation of the multi-layer cardboard material. After couching the first and the second fibrous-material layer, they can be couched with further fibrous-material layers and be subjected to a subsequent drying process or further processing steps. The use of coco peat as a waste product of the coco fiber production in turn represents an inexpensive and resource saving alternative to the use of wood material or also coco fibers. Therein, the portion of fine material particles in the second fibrous-material layer can be 0.1 to 50% by wt. related to the overall weight of the second fibrous-material layer. The employment of 0.1% by wt. of fine material particles already results in considerable saving of resources, in particular wood resources, due to the annual worldwide cardboard demand.

Furthermore, it has surprisingly turned out that the use of fine material particles present in coco peat with a particle size <0.5 mm, in particular <0.3 mm, considerably increases the volume of the second fibrous-material layer by water absorption of the fine material particles during the cardboard production, whereby improved strength and stiffness of the produced multi-layer cardboard material arise. These characteristics are particularly well pronounced if the length-to-width ratio of more than 50% of the fine material particles is 0.7:1 to 1:0.7, in particular approximately 1:1.

Basically, it can be provided that in the production of the individual fiber layers or the individual fibrous-material suspension(s), additives as for example binders, retention agents, fillers, dyes, bleachers, wet strength agents and/or further additives, adjuvants used in the paper and cardboard production are used to influence the production process and the characteristics and processability of the resulting multi-layer fibrous-material web in the desired manner. Suitable fillers are usually minerals like kaolin, talcum or calcium carbonate. For increasing the surface strength and the humidity resistance, starch can be added to the fiber layers or the fiber web resulting therefrom by means of a size press or a starch bath. As the retention agent for controlling the dehydration in forming the individual fiber layers or the sheet formation, polyethyleneimine can for example be added to the fibrous-material suspensions. Therein, biopolymers, for example hemicelluloses, cellulose, lignin and/or polyoses, and/or polysaccharides, for example starch, starch polymers, alginates, chitins, hemicelluloses, cellulose derivatives, cellulose esters, cellulose acetate, cellulose triacetate, cellulose nitrate, cellulose ether, ethyl cellulose, methyl cellulose, oxyethyl cellulose, oxypropyl cellulose and carboxymethyl cellulose, can basically be used as additives. Further basically usable additives include resins such as phenol formaldehyde resins, melamine formaldehyde resins, mixtures of phenol formaldehyde resins and melamine formaldehyde resins, neutral or anionic polymers, polyvinyl alcohol, polyacrylamide, anionic or cationic polyelectrolytes such as for example acrylic acid, carboxymethyl cellulose, anionic or cationic starch, polydiallyl diammonium chloride (PolyDADMAC) or polyvinylamine, natural dry strength agents such as for example galactomannan or alginates, synthetic dry strength agents such as for example polyamines, polyamides, polyalcohols, polyacryl amides, polyvinyl alcohol, polyvinyl(acetate), polyimines or polyethylenimine (PEI), cross-linking or physical wet strength agents such as for example glyoxal, glutardialdehyde (1,5-pentane dialdehyde), aldehyde starch, polyamidoamine epichlorohydrin (PAAE), melamine formaldehyde (MF) or urea formaldehyde (HF), basic, acidic and/or substantive dyes (direct dyes), flame retardants such as for example halogenated flame retardants, organophosphorous flame retardants or inorganic flame retardants such as aluminum hydroxide, magnesium hydroxide, ammonium sulfate, antimony trioxide or antimony pentoxide. Finally, additives from the groups of fixing agents, aluminum salts, flame retardants, defoamers, deaerators, lignin derivatives, lignin sulfonates, biocides and/or fungicides can also be used. Therein, the additives can basically be added one or multiple times at the same location and/or at different locations of the production process.

In a further advantageous configuration of the method according to the invention, at least the following method steps are performed for producing the fine material particles: dissolving the coco peat by means of a pulper; milling the dissolved coco peat; and sieving and/or separating and/or sorting the milled coco peat at least into particle sizes greater and less than 0.5 mm. By milling, it is ensured that a predominant portion of the fine material particles of the coco peat can be supplied to the method according to the invention. Fine material particles having larger particle sizes can be reduced to the desired particle sizes by milling. Thus, the coco peat can be nearly completely used for the production of the multi-layer cardboard material.

The advantages of the multi-layer cardboard material according to the first inventive aspect are to be taken from the descriptions of the first inventive aspect, wherein advantageous configurations of the first inventive aspect are to be regarded as advantageous configurations of the second inventive aspect and vice versa.

A third aspect of the invention relates to a use of a fibrous-material layer including a mixture of cellulose-containing material and fine material particles, wherein a material of origin for the fine material particles is coco peat and the fine material particles have a particle size <0.5 mm, in particular <0.3 mm, for producing a multi-layer cardboard material, in particular a multi-layer cardboard web. By the use of the fibrous-material layer according to the invention, the multi-layer cardboard material can be inexpensively produced in resource saving manner. In addition, the possibility of adjusting predefined volumes of the fibrous-material layer via the portion of fine material particles in the fibrous-material layer arises.

The further features and advantages resulting from the use of the fibrous-material layer are to be taken from the descriptions of the first and the second inventive aspect, wherein advantageous configurations of the first inventive aspect are to be regarded as advantageous configurations of the second and third inventive aspect and vice versa.

Figure 2:
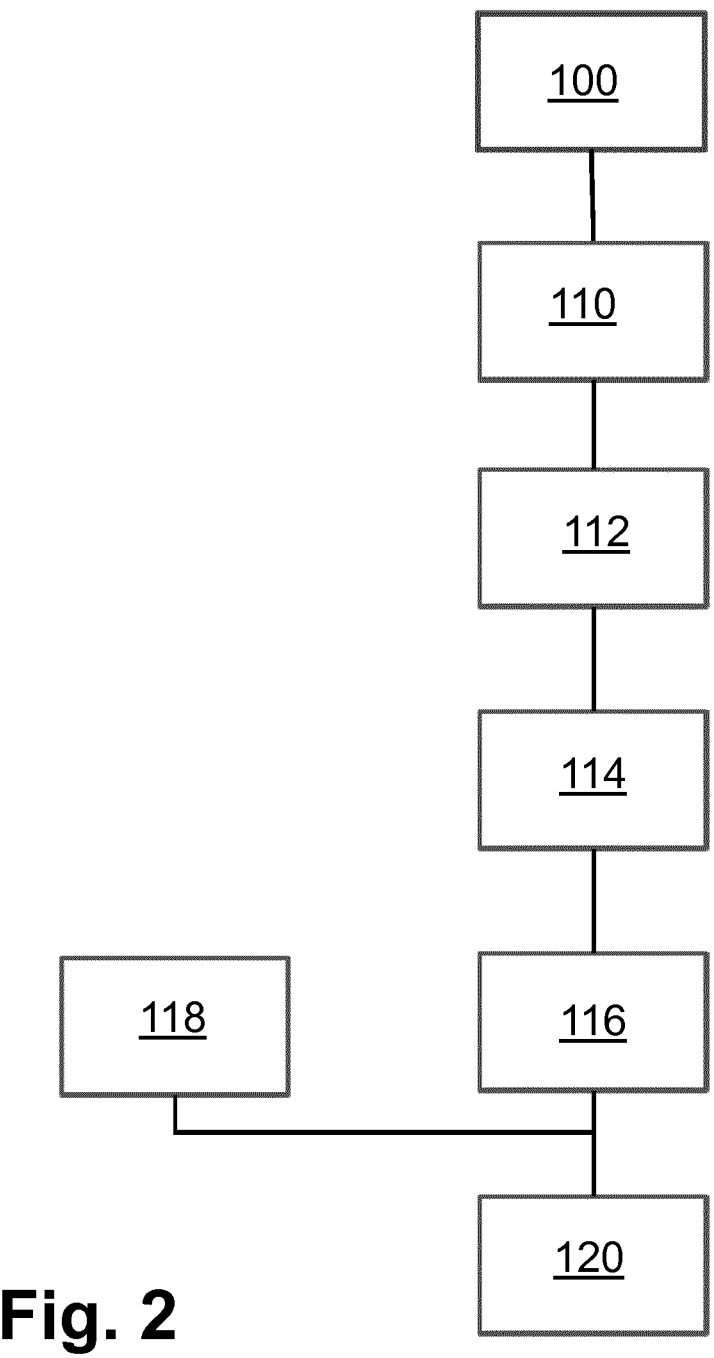

Further features of the invention are apparent from the claims, the embodiments as well as based on the drawings. The features and feature combinations mentioned above in the description as well as the features and feature combinations mentioned below in the embodiments are usable not only in the respectively specified combination, but also in other combinations without departing from the scope of the invention. There shows:

FIG. 1 a schematic representation of a multi-layer cardboard material according to the invention; and FIG. 2 a block diagram of a method procedure for producing a multi-layer cardboard material.

FIG. 1 shows a schematic representation of a multi-layer cardboard material 10. Therein, the cardboard material 10 is usually formed as a cardboard web. One recognizes that the cardboard material 10 is formed four-layer in the illustrated embodiment. Therein, a first fibrous-material layer 12 is formed as a cover layer 12 of the cardboard material 10. Therein, the cover layer 12 has a layer weight or a grammage of 35 g/m². Between the cover layer 12 and a second fibrous-material layer 14, which is formed as an inlay of the cardboard material 10, an underliner 16 with a layer weight of 35 g/m² is disposed. Furthermore, one recognizes that the inlay or second fibrous-material layer 14 is connected to a back layer 18 of the cardboard material 10, wherein the layer weight of the back layer is 35 g/m². The layer weight or the grammage of the second fibrous-material layer 14 formed as an inlay is 165 g/m² in the illustrated embodiment. With incorporation of a coat weight of the cover and back layer 12, 18 of 30 g/m², a grammage of 300 g/m² overall results for the multi-layer cardboard material 10. In addition, the second fibrous-material layer 14 includes a mixture of cellulose-containing material and fine material particles, wherein a material of origin for the fine material particles is coco peat and the fine material particles have a particle size <0.5 mm, in particular <0.3 mm. In the illustrated embodiment, the coco peat portion or the portion of fine material particles in the second fibrous-material layer is 5 to 15% by wt. related to the overall weight of the second fibrous-material layer 14. However, it is also possible that the portion of fine material particles is between 0.1 and 50% by wt. related to the overall weight of the second fibrous-material layer 14.

The multi-layer cardboard material 10 illustrated in the embodiment additionally comprises a coat on the cover layer 12 as well as the back layer 18. However, it is also possible that an uncoated chipboard (not illustrated) is for example formed besides the above described coated cardboard. Herein, the grammages of the individual cardboard layers can have the following values: cover layer 12: 32 g/m², underliner 16: 29 g/m², back layer 18: 35 g/m² and inlay 14: 169 g/m², such that the overall grammage of this multi-layer cardboard material is 265 g/m². Here too, the inlay 14 is again composed of the second fibrous-material layer 14, which is a mixture of cellulose-containing material and fine material particles of coco peat having a particle size <0.5 mm.

FIG. 2 shows a block diagram of an exemplary method procedure for producing the multi-layer cardboard material 10. One recognizes that dissolving the coco peat by means of a pulper is effected in a first method step 100. In a subsequent method step 110, sand particles possibly present in the coco peat can be separated. In a subsequent method step 112, milling (material density range 0.1-8%) of the dissolved coco peat is effected. A further method step 114 follows this method step, in which at least particle sizes greater and less than 0.5 mm are separated from each other by sieving and/or separating and/or sorting the milled coco peat.

In a further method step 116, a first fibrous-material suspension is applied to a first permeable or non-permeable conveyor belt for forming a first fibrous-material layer 12, wherein the first fibrous-material suspension comprises a cellulose-containing base material. At the same time or nearly at the same time, a second fibrous-material suspension is applied to a second permeable or non-permeable conveyor belt for forming a second fibrous-material layer 14 in a method step 118, wherein the second fibrous-material suspension includes a mixture of cellulose-containing material and the fine material particles extracted or obtained from coco peat.

Finally, in a subsequent method step 120, the first fibrous-material layer 12 is couched with the second fibrous material layer 14 with formation of the multi-layer cardboard material 10. Further processing steps, in particular further couching of further fibrous material layers, can follow the method step of couching. In addition, the couched fibrous material can be dried and optionally provided with a coat. In addition, there is the possibility that the surfaces of the cardboard material 10 are smoothed.

The parameter values indicated in the documents for the definition of process and measurement conditions for the characterization of specific characteristics of the inventive subject matter are to be considered as encompassed by the scope of the invention also within the scope of deviations for example due to measurement errors, system errors, weighing errors, DIN tolerances and the like.

The invention claimed is:

1. A multi-layer cardboard material comprising:
at least one first fibrous-material layer, which comprises a cellulose-containing base material; and
at least one second fibrous-material layer including a mixture of cellulose-containing material and fine material particles,
wherein a material of origin for the fine material particles is coco peat and the fine material particles have a particle size of less than 0.5 mm and more than 0.3 mm, and
wherein a length-to-width ratio of more than 50% of the fine material particles is 0.7:1 to 1:0.7.

2. The multi-layer cardboard material according to claim 1, wherein the portion of fine material particles in the second fibrous-material layer is 0.1 to 50% by weight related to the overall weight of the second fibrous-material layer.

3. The multi-layer cardboard material according to claim 1, wherein the first fibrous-material layer is formed as a cover or back layer of the cardboard material.

4. The multi-layer cardboard material according to claim 1, wherein the second fibrous-material layer is formed as an inlay of the cardboard material.

5. The multi-layer cardboard material according to claim 1, wherein the second fibrous-material layer has a grammage between 70 g/m² and 450 g/m².

6. The multi-layer cardboard material according to claim 1, wherein the cardboard material has a grammage between 145 g/m² and 2000 g/m².

7. The multi-layer cardboard material according to claim 1, wherein the cardboard material is constituted of 2 to 10 fibrous-material layers.

8. The multi-layer cardboard material according to claim 1, wherein the length-to-width ratio of more than 50% of the fine material particles is approximately 1:1.

9. The multi-layer cardboard material according to claim 1, wherein the multi-layer cardboard material has a dehydration resistance Schopper-Riegler value of between 20-60 SR°.

10. A method for producing a multi-layer cardboard material, in particular a multi-layer cardboard web, including at least one first and one second fibrous-material layer the method comprising at least the following steps:
applying a first fibrous-material suspension to a first permeable or non-permeable conveyor belt for forming the first fibrous-material layer, wherein the first fibrous-material suspension comprises a cellulose-containing base material;
applying a second fibrous-material suspension to a second permeable or non-permeable conveyor belt for forming the second fibrous-material layer, wherein the second fibrous-material suspension includes a mixture of cellulose-containing material and fine material particles and a material of origin for the fine material particles is coco peat, wherein the fine material particles have a particle size of less than 0.5 mm and more than 0.3, and wherein a length-to-width ratio of more than 50% of the fine material particles is 0.7:1 to 1:0.7; and couching the first fibrous-material layer with the second fibrous-material layer with formation of the multi-layer cardboard material.

11. The method according to claim 10 wherein for producing the fine material particles at least the following methods steps are performed:

dissolving the coco peat by means of a pulper;

milling the dissolved coco peat; and sieving and/or separating and/or sorting the milled coco peat at least into particles sizes greater and less than 0.5 mm.

12. The method according to claim 10, wherein the portion of fine material particles in the second fibrous-material layer is 0.1 to 50% by weight related to the overall weight of the second fibrous-material layer.

13. The method according to claim 10, wherein binders, retention agents, fillers, dyes, bleachers, wet strength agents and/or other adjuvants used in the paper and cardboard production are added to at least one of the first fibrous-material layer and the second fibrous-material layer.

14. The method according to claim 10, wherein the length-to-width ratio of more than 50% of the fine material particles is approximately 1:1.

* * * * *